United States Patent [19]

Thill

[11] 4,074,932

[45] Feb. 21, 1978

[54] EYEGLASSES HAVING SHAPEABLE WEIGHTED TEMPLES

[76] Inventor: William E. Thill, 5151 N. Palm, Suite 410, Fresno, Calif. 93704

[21] Appl. No.: 671,577

[22] Filed: Mar. 29, 1976

[51] Int. Cl.² ............................................... G02C 5/14
[52] U.S. Cl. ...................................... 351/111; 351/123
[58] Field of Search ............... 351/111, 114, 117, 158, 351/123

[56] References Cited

U.S. PATENT DOCUMENTS 3,768,892  10/1973  Bidgood ............................. 351/158

Primary Examiner—Paul A. Sacher
Assistant Examiner—Rodney Bovernick
Attorney, Agent, or Firm—Huebner & Worrel

[57] ABSTRACT

Eyeglasses which have temples made of a material which is substantially rigid at atmospheric temperatures but ductile at a temperature above atmospheric temperature, and a weighting material encapsulated in the material of which the temples are made which is substantially rigid at atmospheric temperatures but liquid at the temperature at which the temples are ductile and the method of fitting said eyeglasses including the steps of heating the temples until they are ductile and the weighting material is liquid, shaping the temples while they are ductile and the weighting material is liquid, and cooling the temples to solidify the weighting material and to make the material of the temples substantially rigid.

8 Claims, 3 Drawing Figures

EYEGLASSES HAVING SHAPEABLE WEIGHTED TEMPLES

BACKGROUND OF THE INVENTION

The present invention relates to eyeglasses which are weighted for balancing or counterbalancing purposes and more particularly to such eyeglasses which have improved fitting facility together with a method for fitting the same.

"Eyeglasses" is a general term intended to embrace optical devices containing corrective lenses for defects in vision or lenses for such special purposes or filters for absorbing portions of the light spectrum, providing physical shields for the eyes, or making available other physical or optical functions for protective or visual assisting purposes.

A normal, or emmetropic, eye focuses light rays from distant objects on the retina by means of complementary deflections of the cornea, lens and fluid of the eye. Such deflections result from light passing from one light transmitting material to another having a different optical density.

Unfortunately, few eyes are so precise in their refractory ability as to produce a sharp retinal image at all reasonable distances. The defects impairing vision may be in curvatures, densities and positions of the eye structures; in variations in the length of the eye ball; in abnormal visual axes; in disparity in the optical characteristics of a person's two eyes; or in defects in ocular movement or control caused by muscle imbalance or failure of coordination.

Much has been done with eyeglasses to correct or ameliorate these and other causes of visual impairment; however, no matter how accurate the diagnosis and precisely appropriate the optical correction, unless the eyeglasses can be maintained in proper relation to the eyes during use the desired coordinated optical reflections are not properly attained.

The present invention resulted from the recognition that much of the impairment of the performance of eyeglasses stemmed from poor balance of the glasses and improper fitting, frequently resulting from accidents during use. It was further recognized that because of the ocular pieces or lenses, the lens frames and the nose bridges of eyeglasses, their centers of gravity were too far toward tending to make them slip down on the wearer's nose or even to fall. The extent of the imbalance can be visualized by thinking of the usual eyeglasses' temples as rested on the wearer's ears as fulcrums. Thus, the weight of the lenses, lens frames, and bridge has a substantial lever arm from such fulcrum making the maintenance of proper fitting understandably difficult.

It was then discovered that such eyeglasses had temples which were extended past a wearer's ears and provided with weights rearwardly of the ears, the weights of the lenses, lens frames and bridges were effectively counterbalanced and fitted position much more effectively and dependably maintained. This was found to be true even if the eyeglasses were not counterbalanced to the extent of actually being balanced on the ears. Since the lenses, lens frames and bridge exert their weight through a much longer lever arm than the weights on the rearwardly extended ends of the temples, it is desirable that the temple weights be substantial in relation to the weight they counterbalance but they need not fully balance on the ears as fulcrums, even partial counterbalancing being of marked advantage.

However, it was soon discovered that the provision of weights on the rearwardly extended ends of the temples interfered with the bending of such temples in the proper fitting of the eyeglasses to the patient.

The present invention has made possible the provision of eyeglasses which have provided temples having weighted rearwardly extended ends which counterbalance the weight of the lenses, lens frames and bridge of such eyeglasses without impairing the proper fitting of the eyeglasses.

SUMMARY OF THE INVENTION

A broad object of the present invention is to provide eyeglasses of improved balance and fit so as to achieve and maintain desired optical-ocular relationships.

Another object is to provide eyeglasses which resist inadvertent displacement.

Another object is to provide counterweights on the rear ends of the temples of eyeglasses.

Another object is to provide such counterweights without impairing the bending or shaping of the temples for fitting purposes.

Another object is to provide an improved method of fitting eyeglasses.

Further objects and advantages are to provide improved elements and arrangements thereof in such improved eyeglasses which are economical, dependable, durable and fully effective in performing their intended operations.

Still further objects and advantages will become apparent in the subsequent description in the specification.

DESCRIPTION OF THE PREFERRED EMBODIMENT

Figure 1:
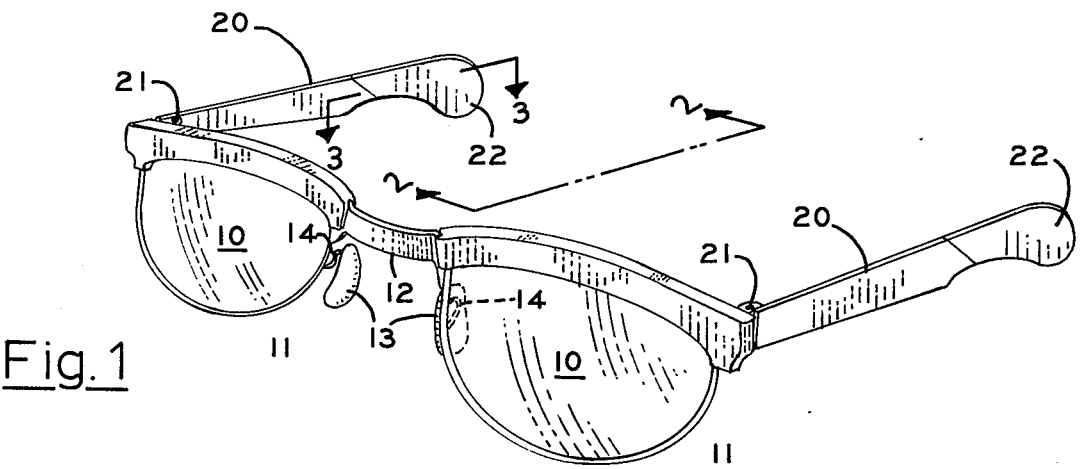
FIG. 1 is a perspective of eyeglasses embodying the principles of the present invention.

Referring in greater detail to the drawing, the eyeglasses shown in FIG. 1 have a pair of ocular pieces or lenses 10 mounted in frames 11 and interconnected by a nose bridge 12. For purposes of comfort, pads 13 are usually provided and mounted on swivels 14 secured to the frames 11. The elements indicated at 10 through 14 are essentially conventional and may be of any desired form, structure, or material.

As is well known in the art, temples 20 are connected to the frames 11 by means of hinges 21 and provide rearwardly extended ends 22. The temples are preferably made of a plastic material which is substantially rigid at normal atmospheric temperatures but which becomes ductile and can be bent or shaped at temperatures above normal atmospheric temperatures. When referred to as being ductile at the elevated temperature, what is meant is that at such temperature the temples are pliable, pliant, malleable, or tractable, in the sense that they can be readily bent or shaped and retain their modified configuration unless forcibly bent or reshaped. Cellulose acetate is popularly employed and excellently suited to the purpose. It is sufficiently ductile at from 60° to 77° C. An epoxy base resin ductile from 82° to 94° C is likewise excellently suited to the purpose. The temples 20 may be formed by compression, transfer, or injection molding of phenolics, ureas, melamines, and other thermo setting plastics or by casting acrylates, polystyrene, polyester and epoxides which are dependent on polymerization rather than cooling to harden and which may be fluidized by heat and pressure and allowed to solidify. Obviously, any other material which is substantially rigid at normal atmospheric temperatures and ductile at a convenient temperature thereabove may be employed, if otherwise suitable. Cellulose acetate is currently most popular, however.

Figure 2:
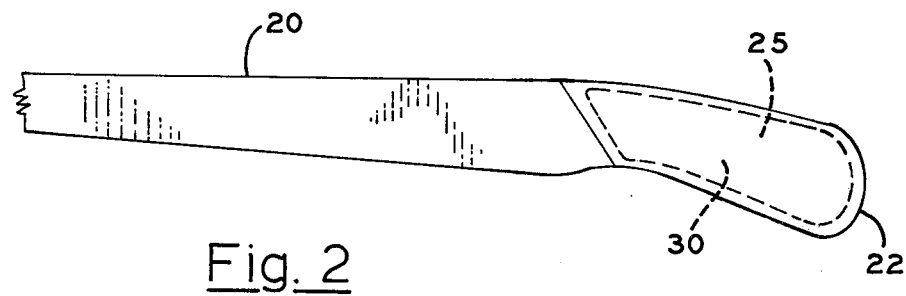
FIG. 2 is a somewhat enlarged fragmentary side elevation of a temple of the eyeglasses of FIG. 1, as viewed from line 2—2 in FIG. 1.
Figure 3:
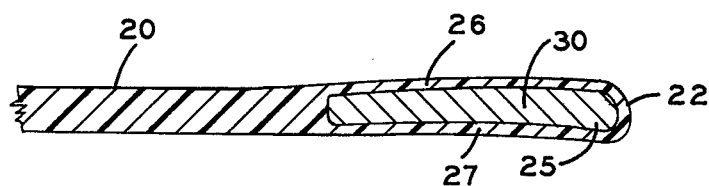
FIG. 3 is a section taken on line 3—3 of FIG. 1.

Referring to FIGS. 2 and 3, it will be seen that the rearwardly extended ends 22 of the temples 20 have cavities 25. The cavities are conviently provided by making the rearwardly extended ends 22 of matching concave portions 26 and 27 which when adhesively joined define the cavities.

When the cavities 25 are formed by joining the concave portions 26 and 27, the cavities are filled with a weighting material 30 which liquifies at a temperature higher than normal atmospheric temperature and is a liquid at the temperature at which the material of the rearwardly extended ends 22 of the temples 20 is ductile. Wood's Metal consisting of four parts of bismuth, two of lead, one of tin, and one of cadmium is excellently suited to the purpose. This alloy melts at 60° C. Another alloy excellently suited to the purpose consists of 23% lead, 5% cadmium, 45% bismuth, 8% tin, and 19% indium and liquifies at 47° C. An alloy of 18% lead, 49% bismuth, 12% tin and 21% indium which melts at approximately 58° C is another example of a suitable material. An alloy of 37.7% lead, 8.5% cadmium, 42.5% bismuth and 11.3% tin is useable but its higher melting point requires temples of a material that are properly but not excessively ductile at temperatures above 70° C. Any suitable weighting material may be used but it should preferably be of a higher specific gravity than the encapsulating material of the temples.

It will be apparent that the eyeglasses of the present invention are not limited to specific materials. The broad essence of the invention resides in the utilization of temples 20 having cavities 25 in the rearwardly extended ends thereof which cavities are filled with a weighting material 30 which liquifies at a temperature above normal atmospheric temperatures and which is encapsulated in a material of which the temples are made which is ductile and may be shaped at the temperature at which the material in the cavity 25 is liquified.

OPERATION

The operation of the described embodiment of the present invention is believed to be clearly apparent and is briefly summarized at this point. When it is desired to fit the eyeglasses to a user, the rearwardly extended ends 22 of the temples 20 are inserted into a heated salt pan, bead pan, sand pan or the like, well-known in the art for heating temples to permit their bending and other shaping. When the temperature of the material 30 reaches its point of liquification, the material of the temples 20 is ductile. The temples, including their rearwardly extended ends 22 are then shaped to achieve the proper fitting to the patient. When proper fitting is achieved, the eyeglasses are permitted to cool whereupon the encapsulated material 30 solidifies and the encapsulating material becomes substantially rigid. Once this occurs, the temples are dependably and permanently shaped unless reheated. If the temples are in need of re-shaping, the procedure is simply repeated for whenever the encapsulated material 30 reaches its melting point and liquifies, the material of the temples is ductile and can be readily reshaped.

When the eyeglasses are worn, they not only have the advantage of the rearwardly extended ends 22 being permanently and dependably shaped, but they provide weights in rearwardly spaced relation to the ears of the wearer so that the weights acting through their lever arms rearwardly of the fulcrum of the ears, counterbalance all or part of the weight of the lenses 10, frames 11, and bridge 12, operating through their lever arms forwardly of said fulcrums. Such weights resist displacement of the eyeglasses, aid in maintaining proper positioning of the eyeglasses, and minimize dropping thereof. Such eyeglasses have little or no tendency to slide downwardly on the nose of a wearer and thus avoid the normal repetitious manual shoving of the eyeglasses upwardly on the nose to maintain proper optical-ocular relationships.

Although the invention has been herein shown and described in what is conceived to be the most practical and preferred method and apparatus, it is recognized that departures may be made therefrom with the scope of the invention.

Having described my invention, what I claim as new and desire to secure by Letters Patent is:

1. In eyeglasses having a pair of ocular pieces; a bridge interconnecting the pieces; and temples rearwardly extended from the ocular pieces, said temples comprising a weighting material, and a relatively lighter material encapsulating the weighting material, the weighting material having a substantially higher specific gravity than the encapsulating material and a melting point above normal atmospheric temperatures and the encapsulating material being ductile at said melting point but substantially rigid at normal atmospheric temperatures.

2. The eyeglasses of claim 1 in which said melting point is from approximately 47° to 70° C.

3. The eyeglasses of claim 1 in which said encapsulating material is ductile from approximately 60° to 94° C.

4. Eyeglasses comprising a pair of ocular pieces, a nose bridge interconnecting the pieces, and temples individually extended from the pieces adapted to rest on the ears of a wearer and to provide ends extended rearwardly of the wearer's ears, the ends being of a material which is substantially rigid at normal environmental temperatures and ductile at a temperature above said normal environmental temperatures and having cavities therein, and weighting material substantially filling the cavities having a melting temperature above normal environmental temperature but below the ductile temperatures of said material.

5. The eyeglasses of claim 4 in which said material is cellulose acetate and the weighting material is Wood's Metal.

6. In eyeglasses having temples of a material substantially rigid at normal environmental temperatures and ductile at a temperature above normal environmental temperatures, a weighting material encapsulated in said temples which is substantially rigid at normal environmental temperatures and fluid at the temperature at which the temples are ductile.

7. The eyeglasses of claim 6 in which the temples have rearwardly extended ends adapted to extend rearwardly from a wearers ears and the weighting material is encapsulated in said rearwardly extended ends.

8. In a pair of eyeglasses having a pair of lenses, a nosepiece disposed between the lenses adapted to rest on the nose of a wearer, and a pair of temples individually extended from the lenses rearwardly over the ears of the wearer and terminating in rearwardly extended ends, said temples being substantially rigid at normal environmental temperatures and ductile at a temperature above normal environmental temperature, the rearwardly extended ends of the temples each having a cavity therein, and a weighting material having a specific gravity greater than that of the temples substantially filling said cavities, the weighting material being substantially rigid at normal environmental temperatures and liquid at the temperature at which the temples are ductile.

* * * * *